United States Patent
Diewald

(10) Patent No.: US 10,572,300 B2
(45) Date of Patent: Feb. 25, 2020

(54) APPARATUS AND METHOD FOR CONFIGURING A MICROCONTROLLER SYSTEM

(71) Applicant: ProJoule GmbH, Freising (DE)

(72) Inventor: Horst Diewald, Freising (DE)

(73) Assignee: ProJoule GmbH, Freising (DE)

( * ) Notice: Subject to any disclaimer, the term of this patent is extended or adjusted under 35 U.S.C. 154(b) by 165 days.

(21) Appl. No.: 15/575,852

(22) PCT Filed: May 21, 2015

(86) PCT No.: PCT/EP2015/061274
§ 371 (c)(1),
(2) Date: Nov. 21, 2017

(87) PCT Pub. No.: WO2016/184525
PCT Pub. Date: Nov. 24, 2016

(65) Prior Publication Data
US 2018/0129531 A1    May 10, 2018

(51) Int. Cl.
*G06F 9/48* (2006.01)
*G06F 1/32* (2019.01)
*G06F 15/78* (2006.01)
*G06F 1/3234* (2019.01)
*G06F 9/445* (2018.01)

(52) U.S. Cl.
CPC .......... *G06F 9/4812* (2013.01); *G06F 1/3243* (2013.01); *G06F 15/7814* (2013.01); *G06F 9/44505* (2013.01); *Y02D 10/12* (2018.01); *Y02D 10/13* (2018.01); *Y02D 10/43* (2018.01)

(58) Field of Classification Search
CPC .. G06F 9/4812; G06F 1/3243; G06F 15/7814; G06F 15/7842
See application file for complete search history.

(56) References Cited

U.S. PATENT DOCUMENTS 5,805,909 A    9/1998   Diewald
9,543,956 B2 *  1/2017  Hooi ................... H03K 19/177
(Continued)

OTHER PUBLICATIONS

International Search Report and Written Opinion for corresponding Patent Application No. PCT/EP2015/061274 dated Jan. 28, 2016.

*Primary Examiner* — Stefan Stoynov
(74) *Attorney, Agent, or Firm* — Renner, Otto, Boisselle & Sklar, LLP

(57) ABSTRACT

A microcontroller system and a method of configuring a microcontroller system is provided. The microcontroller system comprises a central processing unit, memory associated with the microcontroller system, event receiving means operable to receive an event, and configuration control means. The configuration control means is operable to collect one or a plurality of sets of configuration data from said memory, each of said sets of configuration data defining a configuration related to at least one operational unit of the microcontroller system, wherein said sets of configuration data are associated with a first operation mode associated with the microcontroller system. Moreover, the configuration control means is operable to determine a set of configuration data of the sets of configuration data and to configure the microcontroller system corresponding to said determined set of configuration data.

31 Claims, 6 Drawing Sheets

(56) References Cited

U.S. PATENT DOCUMENTS

| | | | |
|---|---|---|---|
| 9,684,367 B2* | 6/2017 | Hanssen | G06F 1/3243 |
| 9,785,444 B2* | 10/2017 | Mortensen | G06F 15/7889 |
| 2010/0191979 A1 | 7/2010 | Zipperer et al. | |
| 2014/0047247 A1 | 2/2014 | Rzehak et al. | |

* cited by examiner

APPARATUS AND METHOD FOR CONFIGURING A MICROCONTROLLER SYSTEM

This application is a national phase of International Application No. PCT/EP2015/061274 filed May 21, 2015 and published in the English language.

FIELD

Aspects of the present disclosure relate to configuring the hardware of a microcontroller system based on operation modes.

BACKGROUND

A computer system usually includes a programmable unit, such as a CPU, and memory, on which program code to be executed by the programmable unit, and data related to an application running on the computer system can be stored. Memory may be classified as read-only memory (ROM), non-volatile memory (i.e. Flash) and random access memory (RAM). A computer system furthermore includes peripheral units for providing input/output, clocking, power, and/or co-processors or hardware accelerators for providing specific computing tasks.

A microprocessor usually does not have memory, such as RAM and ROM, and other peripheral units on the chip. Even though according to recent developments, high performance microprocessors may also have cache memories, graphical processing units and other accelerators on-chip, they usually have a high amount of resources like RAM, ROM, I/O ports, etc., to be added externally in order to provide a functional microprocessor computer system. Microprocessors may have applications that are usually not specific, i.e., the relationship between input and output is not defined.

A microcontroller system, for example, has a programmable unit, in addition with a fixed amount of code and data memory, and other operational or peripheral units all integrated on a single chip. Microcontroller systems are therefore often referred to as system-on-chip (SoC) and/or as system-in-package (SiP) computer systems. Microcontroller systems may be designed for specific applications, i.e. to permit conducting of end-user related coordinated functions, tasks, or activities. As an example, a microcontroller system application processes an input provided by some peripheral units, and provides an output based on the processing. Microcontroller systems typically need small resources in terms of RAM, ROM, Flash, I/O ports, etc., which may be embedded, as mentioned, on a single chip or system-in-package. This in turn reduces the size and the cost compared to microprocessor systems.

Microcontroller systems are capable of using different configurations of their hardware. For example, the operational units associated with a microcontroller system can be individually configured to tailor energy consumption and/or to provide different levels of safe operation. Developers provide an increasing number of options, such as power gating voltages and clock gating frequencies for configuring individual portions, pieces of hardware or hardware circuits (e.g., operational units, functional islands), or software instances used to program the CPU and/or other hardware associated with a microcontroller system thereby increasing complexity. With respect to operational safety, individual operational units may be configured with different levels of access rights. For example, a section in a memory may be protected such that it can be read during normal operation of the system, but not be overwritten. In another example, an operational unit may be configured such that certain access rights are required by other pieces of the hardware or by the software to access the circuit. Often, the configuration of the individual hardware circuits associated with a microcontroller system involves more than 200 parameters that have to be defined. It is therefore a challenge for the users of the microcontroller system to provide applications that make use of the microcontroller system in an energy-optimized fashion with an appropriate level of operational safety, in order to optimize energy consumption and/or safety per performed task, to achieve fast development time, and reduce software maintenance efforts.

Thus, there is considerable need for apparatuses and methods that offer flexible and simplified handling of microcontroller system configurations.

SUMMARY

The present disclosure provides apparatus and methods for configuring microcontroller systems using one or a plurality of sets of configuration data associated with an operation mode that define a configuration related to at least an operational unit of a microcontroller system.

In some aspects, a microcontroller system is provided. The microcontroller system comprises a central processing unit, memory associated with the microcontroller system, event receiving means operable to receive an event, and configuration control means. The configuration control means is operable to collect one or a plurality of sets of configuration data from said memory, each of said sets of configuration data defining a configuration related to at least one operational unit of the microcontroller system, wherein said sets of configuration data are associated with a first operation mode associated with the microcontroller system. Moreover, the configuration control means is operable to determine a set of configuration data of the sets of configuration data and to configure the microcontroller system corresponding to said determined set of configuration data.

In other aspects, a method of configuring a microcontroller system is provided. The method includes receiving an event and collecting one or a plurality of sets of configuration data from said memory, wherein each of said sets of configuration data defines a configuration related to at least one operational unit of the microcontroller system, wherein said sets of configuration data are associated with a first operation mode associated with the microcontroller system. The method further comprises determining a set of configuration data of the sets of configuration data and configuring the microcontroller system corresponding to said determined set of configuration data.

In further aspects, a computer program is provided that comprises program instructions which are computer-executable to implement the steps of the above-mentioned method.

Various objects, features, aspects, and advantages of the present disclosure will become more apparent from the following detailed description, along with the accompanying drawings in which like numerals represent like components.

DESCRIPTION OF THE DRAWINGS

In order to better understand the present disclosure and to appreciate the practical applications, the following figures are provided and referenced hereafter. It should be noted that the figures are given as examples only and in no way limit the scope of the disclosure.

DETAILED DESCRIPTION

The present invention will be described hereinafter in more detail with reference to the accompanying figures, in which exemplary embodiments of the invention are illustrated. However, the present invention may be embodied in different forms and should not be construed as limited to the embodiments set forth herein. Rather, these embodiments are provided so that this disclosure will be thorough and will convey the scope of the invention to persons skilled in the art.

Figure 1:
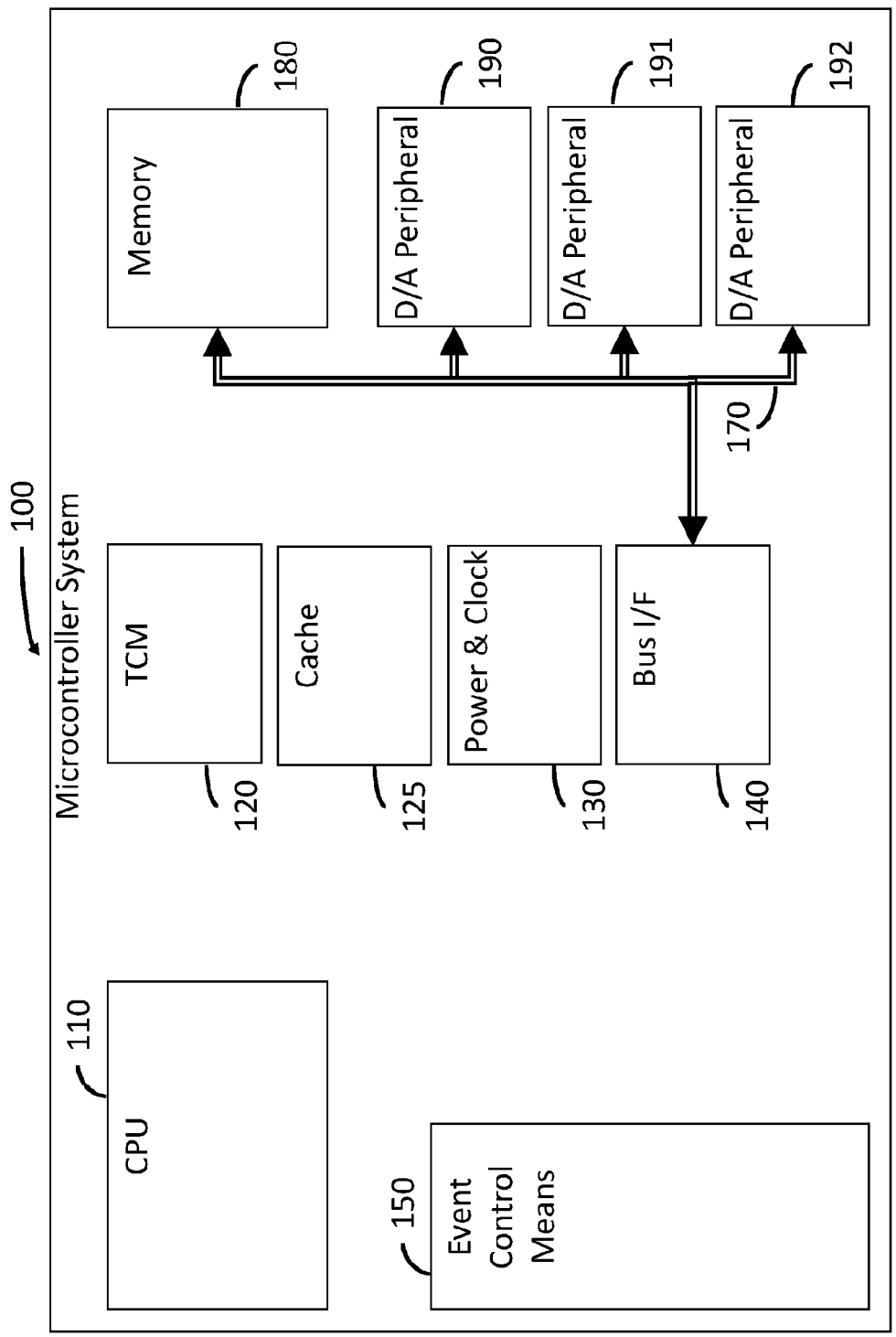
FIG. 1 is a simplified diagram of a microcontroller system.

FIG. 1 is a simplified diagram of a microcontroller system 100. The microcontroller system 100 may include a central processing unit (CPU) no and an event controller 150 for receiving and handling events, such as interrupts or wake-up signals arriving from other entities implemented in hardware and/or software. The event controller 150 may be coupled to a tightly coupled memory (TCM) 120 and to a cache memory 125, a power and clock unit 130, and a bus interface (I/F) 140. Any kinds of data, such as program data and data related to applications running on the microprocessor system may be transmitted via bus 170 between memory 180 and bus interface 140. Bus 170 may also couple to digital/analog peripheral units 190, 191 and 192. Peripheral units 190, 191 and 192 may relate to analog to digital converters (ADC) or digital to analog converters (DAC) for providing input and output for the microcontroller system, respectively. Peripheral units 190, 191 and 192 may also relate, respectively, to input/output entities, such as keyboards, displays, or mass storage, etc. Memory 180 and digital/analog peripheral units 190, 191 and 192 may also be coupled to event controller 150 via the bus I/F 140 and bus 170 for providing configuration signals to configure the respective hardware circuits. In the same manner, the coupling of event controller 150 with the CPU 110, the TCM 120 the power and clock system 130 and the bus interface 140 serves to configure the respective units. Event controller 150 may support vectored events, nesting of interrupts of different priorities, etc.

In operation, an event (e.g., an interrupt, an exception, a TRAP, a wake-up signal, etc.) may arrive at the event controller to trigger the microcontroller system to perform a task. The event controller may trigger configuration of the hardware circuits associated with the microcontroller system to properly handle the request behind the interrupt. For example, in US 2010/0191979 A1, an embedded microcontroller system includes a system controller for receiving and handling an interrupt, and a register having storage locations containing sets of predefined system data for different operating conditions of the system associated with the interrupts coupled to a set of system configuration. The system data in the register is defined and stored before receipt of an interrupt. On receipt of an interrupt, the system controller transmits a selection signal to the register. The register selects a predefined storage location associated with the received interrupt. The corresponding system configuration data is used to control system configuration of the microcontroller system, such as allocation of CPU time to virtual CPUs and selection of clock frequency or operation voltage for operational units.

US 2014/0047247 A1 discloses a control system for microprocessors that offers an unlimited variety of hardware-supported power settings that may satisfy any operating scenario. The microprocessor unit comprises a register that contains particular bit fields for defining selectable power settings. The particular bit fields in the register define pointers to a power setting defining register. Each pointer selects a corresponding bit field in the power setting defining register. The bits in the bit fields of the power setting defining register either directly control a power setting of at least one functional or peripheral blocks of the system; or they are pointers to a further power setting defining register, and the bits in the bit fields of the further power setting defining register directly control a power setting of at least one functional or peripheral blocks of the system.

However, in the state of the art, defining and maintaining those configurations over many development cycles is a complex and error-prone task for the programmer of a microcontroller system. Moreover, for example in US 2010/0191979 A1 and US 2014/0047247 A1, the configurations are not flexibly adaptable, e.g., based on an operation mode of the microcontroller system, based on specific events and/or operating conditions under which an event shall be served. It exists therefore a need for simplified and more flexible handling of microcontroller system configurations.

Figure 2:
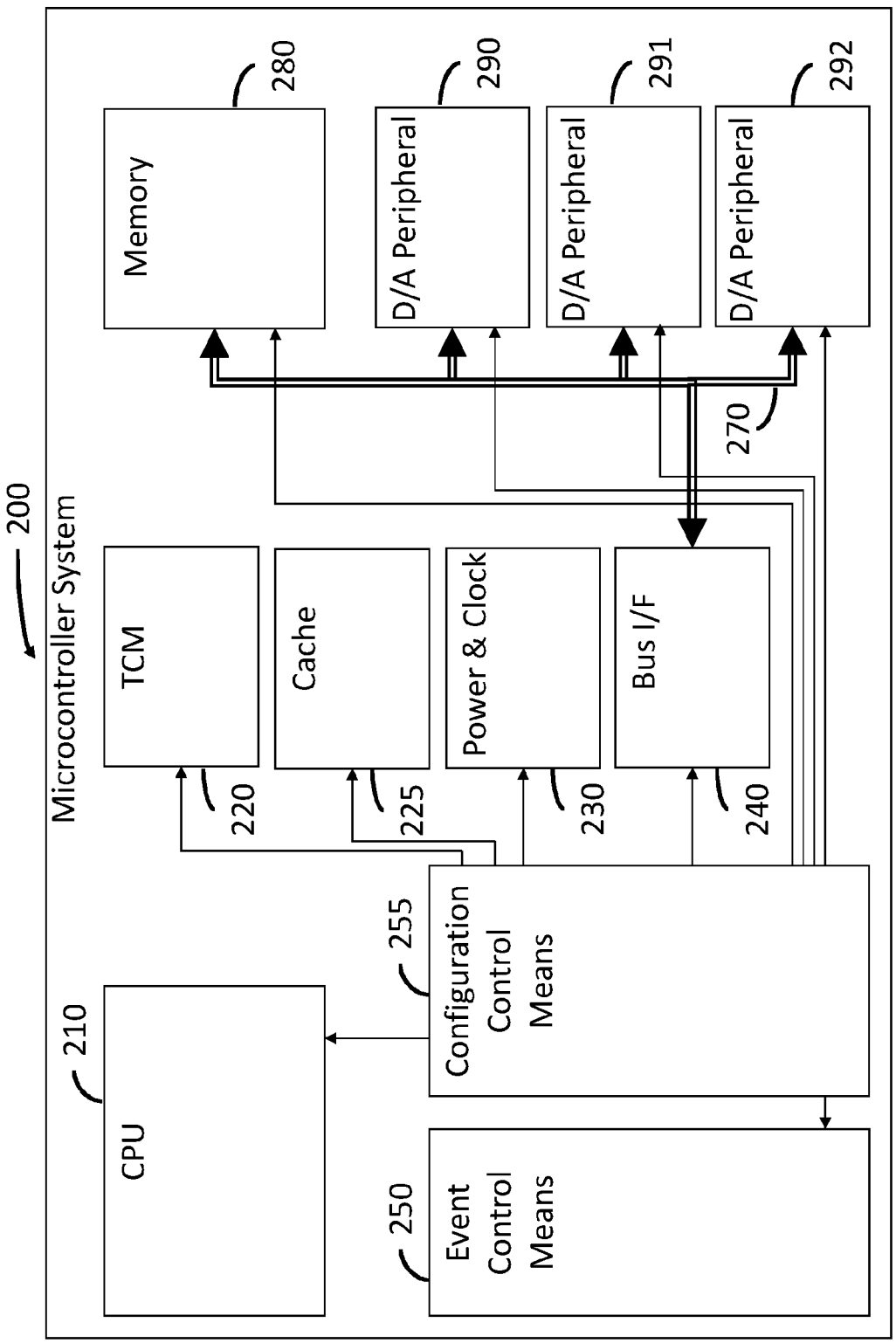
FIG. 2 illustrates a simplified diagram of a microcontroller system according to aspects of the present disclosure.

FIG. 2 illustrates a simplified diagram of a microcontroller system 200 according to aspects of the present invention. The microcontroller system 200 comprises different operational units or portions, such as functional islands or operational modules (e.g., hardware circuits of the microcontroller system configurable with respect to power gating and/or clock gating and/or safety aspects, such as limiting access based on access rights) as will be explained in the following. Among those operational units of the microcontroller system are a central processing unit (CPU) 210, tightly coupled memory (TCM) 220, cache memory 225 associated with the microcontroller system, and configuration control means 255. TCM 220, which can be used by CPU 210 for storing program and data information, is a low-latency memory having predictable access times. Cache memory 225 may be partitioned into program cache and data cache. In some cases, more than one CPU is used in the microcontroller system. Operational units may also relate to software, e.g., a software thread or a process used to program the CPU and/or other hardware. For example, specific functions may be provided by software routines and/or by instances of software objects. More specifically, for example, hardware units may be driven by software to provide a front end for the user, where specifics of accessing the hardware are hidden to the user. In another example, specific functionality may be provided by software instances as an abstraction layer over basic instructions of the CPU or other hardware units. In other examples, software instances may instantiate a software process, e.g., by allocating memory associated with the process to store data relevant to the process instance, and by executing program software associated with the process. In view of the present disclosure, an operational unit may relate to any instance implemented by a microcontroller system using hardware and/or software, or any combination thereof to provide a functionality of the microcontroller system.

The event control means 250 according to FIG. 2 is operable to receive an event, e.g., an interrupt, an exception, a TRAP, a wake-up signal and/or other signals triggering an action of the microcontroller system. The event control means 250 may support vectored events, nesting of events of different priorities, etc. Event control means 250 may support hardware and software events. Hardware events may be triggered by circuits outside the microcontroller, or by operational units that are part of the microcontroller system itself. Software events may be triggered from software being executed on the microcontroller system, e.g., by using a specified command. The event control means 250 may be operable to monitor hardware and software interfaces for incoming events and accept, mask (e.g., drop) or queue a particular event based on priority associated with the event. Events may be provided to the configuration control means 255 when they are accepted by event control means 250. The microcontroller system 200 may further comprise a power and clock unit 230 for supplying the system, or at least parts thereof, with respective power and clock signals, and a bus interface (I/F) 240 for providing appropriate signals for bus 270. Some systems may include more than one power and clock unit, each of which supplying different parts of the microcontroller system with respective power and clock signals, and/or more than one bus interfaces, e.g., when the system includes more than one bus. Moreover, the microcontroller system according to this example includes digital/analog peripheral units 290, 291 and 292. According to some aspects, configuration control means 255 may be adapted to configure the operational units of the microcontroller system, which is illustrated in FIG. 2 by the lines originating from the configuration control means 255. It should be noted that the operational units of microcontroller system 200 as shown in FIG. 2 are for illustration only. Other microcontroller systems according to the invention may include different setups of operational units that may interact differently.

In some aspects, configuration control means 255 is operable to collect one or a plurality of sets of configuration data from the memory. In the techniques described herein, each of the sets of configuration data define a configuration related to at least one operational unit of the microcontroller system. The sets of configuration data are associated with a first operation mode associated with the microcontroller system. Furthermore, in the techniques described herein, according to some aspects, a set of configuration data is determined, and the microcontroller system is configured based on the determined set of configuration data.

By defining operation modes, the number of different configurations can be significantly reduced. For example, the user of the microcontroller system may define a limited number of operation modes which is sufficient for a particular application associated with the system. Hence, by using operation modes, handling of different configurations of the microcontroller system can be significantly simplified.

On the other hand, as the configuration of the microcontroller system in a particular operation mode is based on one or a plurality of sets of configuration data, and by determining (e.g., selecting) a set of configuration data of the sets of configuration data, flexibility of configuration within an operation mode can be achieved. In particular, different configurations may be used within an operation mode in order to flexibly adapt to different operating conditions. Furthermore, even though in some cases they may do so, the sets of configuration data need not specify the configuration of the entire microcontroller system. In some examples, configurations of the microcontroller system may be given by a pre-defined configuration according to the first operation mode. In these cases, the sets of configuration data may specify a configuration of a part of the system only, or of a part of the parameters used to specify the configuration of all operational units of the system. For example, the sets of configuration data may respectively only address those configuration parameters that are different compared to a pre-defined configuration, such as a previous configuration active before receiving the event. In this way, it is possible to address specific configurations (e.g., of some of the operational units) within an operation mode. For example, in an operation mode, some operational units may be configured temporarily (e.g., for handling an event), and may then return to the previous configuration. Hence, by using sets of configuration data, configurations given in an operation mode may be flexibly adapted to specific operation conditions. Additionally or alternatively, within an operation mode, the particular configuration (e.g., the collecting of the one or the plurality of sets of configuration data, and/or the determining of a set of configuration data of the sets of configuration data) may be based on the event. This may include collecting pre-configured sets of configuration data that relate to the event or a specific group of events, e.g., in reaction to the event received by event receiving means 250, or based on the event being expected to be received in the first operation mode. These examples may include determining a set of configuration data in reaction to the event, e.g., based on arguments of the event vector, and/or based on the configuration that was active upon receiving the event, based on the application (e.g. the unit of program execution) that triggered the event, etc. Therefore, it is possible to provide a configuration that can be individually adapted to operating conditions within an operation mode.

As discussed above, the sets of configuration data are associated with an operation mode of the microcontroller system. Hence, by defining different operation modes, different sets of configuration data can be provided based on the operation mode. This may include collecting different sets of configuration data in a first and second operation mode. Additionally or alternatively, the same sets of configuration data may be associated with at least two operation modes, while they may be different for other operation modes. As an example, in a first operation mode, first sets of configuration data may apply, whereas in a second operation mode, second sets of configuration data may apply, wherein first and second sets of configuration data may be different. Additionally or alternatively, the sets of configuration data may be based on an event, as explained above. Hence, in a particular operation mode, based on different events and/or parameters describing event execution control data (e.g., system state information), different sets of configuration data may be provided. This may include, for example, collecting a first one or a plurality of sets of configuration data based on a first event, and collecting a different second one or a plurality of sets of configuration data based on a second event. In another example, this may include collecting different sets of configuration data based on the same event, but based on different system state information.

In some cases, the same sets of configuration data may be associated with different operation modes, as mentioned. For example, the configurations of the at least one operational unit defined by the sets of configuration data may be the same for more than one (e.g., two) operation modes. This may be in particular useful to reduce the amount of configurations for different operation modes. In these examples, the operation modes may differ by configurations of operational units of the microcontroller system that are not defined by the sets of configuration data. For example, in a first operation mode, some access rights to the hardware, or some peripheral units, such as a universal asynchronous receiver transmitter (UART) may be configured in a first operation mode, but not in a second operation mode, wherein the sets of configuration data are the same for both operation modes. In such examples, the first mode may serve as a debug or other operation and maintenance mode of the microcontroller system, whereas the second operation mode is a productive mode.

In some aspects according to the present disclosure, the one or the plurality of sets of configuration data defines the configuration of said at least one operational unit of the microcontroller system related to energy consumption and/or safe operation of the microcontroller system. As an example, energy consumption of a microcontroller system can be influenced by power gating, clock gating, and/or dynamic voltage/frequency scaling of operational units associated with the system. In power gating, the supply voltage of an operational unit can be switched either on or off. In this way, static energy consumption of operational units (e.g., due to leakage currents semiconductor devices) can be minimized. Clock gating may reduce the dynamic or switching energy consumption of operational units. Clock gating turns off clocks, thereby freezing the operational state while still maintaining the original functionality of a unit. A further technique to tailor energy consumption of an operational unit is dynamic voltage/frequency scaling. Usually, the maximum frequency at which a hardware component can operate is dependent on the supply voltage. For example, operational units may operate based on a supply voltage that is reduced compared to the maximum supply voltage. In these cases, the maximum frequency at which the system can operate is reduced. However, in these configurations, the energy consumption is limited compared to operation at maximum supply voltage and clock frequency. On the other hand, at high supply voltages and clock frequencies, computational speed is increased, but the static and dynamic energy consumption is also increased. Therefore, in cases where an operational unit may not require the full computational performance, supply voltage as well as clock frequency may be reduced at the same time, achieving a lower energy consumption.

Safe operation of the microcontroller system may be required for preventing resources of the system (e.g., memory segments or operational modules) from intentionally or unintentionally being corrupted. For example, faults may occur when two or more different units of program execution (e.g., threads) are running in multi-tasking operation. In this case, a first thread may intentionally or unintentionally corrupt the code, data, or stack of another thread. In order to separate the resources of different threads and protect them from intended or unintended access, segments of memory and/or operational units of the microcontroller system may be configured with different levels of protection and access rights. Furthermore, upon detection of a fault, operational units may be configured with a specific protected state in order to recover from fault. For example, such a safe environment may be implemented in a way operational units are associated with identification numbers and/or vectors (ID). A currently active ID, $ID_{now}$ and a future $ID_{next}$ associated with an operational unit (after a new configuration getting active) may be part of the configuration data. The currently active $ID_{now}$ associated with the operational unit may be compared with the $ID_{now}$ according to the configuration data, where, in case it matches, the process continues. Otherwise the mismatch may be signaled to a safe operation hard- or/and software instance. Furthermore, the currently active $ID_{now}$ may to be part of the return data available in a return situation ($ID_{return}=ID_{now}$), e.g., from an event, where a safe operation hard- or/and software instance may check whether $ID_{return}$ equals $ID_{now}$ and issue an alert when both IDs are not equal. In other examples, the $ID_{next}$ may be used to replace the current active $ID_{now}$ in a "rolling key" mechanism. For example, the replacement may be used to verify that a specific configuration is replaced by an intended other configuration. Furthermore, the rolling key mechanism may be used to verify that in a specific operation mode the used hard- and software (e.g., an event service routine, ESR) match.

In some aspects according to the present disclosure, the microcontroller system may comprise a plurality of operational units. Furthermore, said plurality of operational units may be configurable by a set of operational unit configuration parameters related to the plurality of operational units. In the first operation mode, the sets of configuration data may define configurations of a strict subset of said set of operational unit configuration parameters. Furthermore, techniques according to these aspects include configuring the parameters of the absolute complement of said strict subset using a pre-defined configuration.

In an exemplary example, the microcontroller system according to FIG. 2 may include CPU 210, TCM 220, cache 225, power and clock unit 230, bus interface 240, event control means 250, configuration control means 255, memory 280 and peripheral units 290, 291 and 292, as described. Those operational units are configurable by a set of operational unit configuration parameters, say 210A, 210B, 210C; 220A; 225A; 230A; 240A, 240B; 250A, 250B; 255A, 255B; 280A, 280B; 290A, 290B; 291A, 291B; 292A, 292B, which is explained in more detail with respect to FIG. 4 below. Hence, in some aspects, those parameters may entirely configure the operational units of the microcontroller system.

In this example, the sets of configuration data associated with the operation mode of the microcontroller system 200 may only define a configuration of a strict subset of the entire configuration set, e.g., parameters 210A, 210B; 290A, 290B; 291A, 291B, which may only relate to a part of operational units, e.g., CPU 210 and peripheral units 290, 291. The remainder of the parameters, e.g., the set 210C; 220A; 225A; 230A; 240A, 240B; 250A, 250B; 255A, 255B; 280A, 280B; 292A, 292B, which is the absolute complement of the strict subset of parameters covered by the sets of configuration data, are configured using a pre-defined configuration. In some examples, some of the operational units of the complement subset are powered off or inactivated by default, because they are not used in the particular operation mode. For example, TCM 220, cache 225 and peripheral unit 292 may be turned off in the first operation mode. As can be concluded from this example, the operation mode may define a basic scope of operation of the microcontroller system. For example, in a dormant mode, only a small part of the afore-mentioned operational units of the microcontroller system may be activated. For operational units not activated in a particular operation mode, and/or those configuration parameters having no different configurations within the operation mode, a pre-defined configuration may apply. In other operation modes, the scope of operation may be extended. For example, in a run mode of the microcontroller system, almost all operational units may be activated. However, in some operation modes, for example, pre-defined configurations may be used also for some of the activated operational units. In the present exemplary example, power and clock system 230, bus I/F 240, event control means 250, configuration control means 255 and memory 280 may be activated and operating in the first operation mode, but those operational units are configured according to a pre-defined configuration. In this case, there is no need to define sets of configuration data related to operational units 230, 240, 250, and 255 and 280 in the sets of configuration data. In this way, the amount of data that has to be considered in the sets of configuration data can be drastically reduced, enabling an application-centric design.

As mentioned, in some aspects, the collecting of the one or the plurality of sets of configuration data, and/or the determining of a set of configuration data of the sets of configuration data may be based on the event. In these cases, the amount of data that it to be considered in the sets of configuration data may further be reduced. More specifically, in these cases, only those parameters may be considered in the sets of configuration data that may be respectively different from a pre-defined configuration based on the event. For example, in a particular operation mode, first sets of configuration data may define configurations of a first strict subset of said set of operational unit configuration parameters based on a first event, and second sets of configuration data may define configurations of a second strict subset of said set of operational unit configuration parameters based on a second event. In the present exemplary example, based on the first event, the strict subset of the set of operational unit configuration parameters may include parameters 210A, 210B, 290A, 290B, 291A and 291B. However, based on a second event, the strict subset of the set of operational unit configuration parameters may only include parameters 210A, 210B, 240A, 240B, 290A and 290B. Hence, this set includes parameters for configuring bus I/F 240, as this may be useful for serving the second event. Furthermore, the latter set does not include parameters for configuring digital/analog peripheral unit 291, as the latter peripheral unit may be configured according to a pre-defined configuration related to the first operation mode.

In some aspects, said pre-defined configurations may at least in part be independent of the operation mode. In other aspects, said pre-defined configurations may depend on the operation mode in that for at least two operation modes different pre-defined configurations are defined. In some aspects, pre-defined configurations may be subject to change within an operation mode. For example, default configurations may apply as a pre-defined configuration upon entry of an operation mode that may initially be used to configure the entire system. However, during progress in executing the mode, the default configuration related to the sets of configuration data may at least in part be overwritten by configuring the microcontroller system corresponding to a determined set of configuration data, as explained above.

Furthermore, as mentioned above, sets of configuration data defining a configuration of a strict subset of the set of operational unit configuration parameters may be used for more than one operation mode. In such cases, operation modes may differ by their pre-defined settings, but not by the respective sets of configuration data.

In some aspects according to the present disclosure, the sets of configuration data in a different second operation mode define configurations of a second subset of the set of operational unit configuration parameters.

In the exemplary example of the microcontroller system according to FIG. 2 as described above, in a first operation mode, sets of configuration data associated with the CPU 210 and peripheral units 290, 291 may be defined. As mentioned above, the remainder of operational units may be configured using pre-defined configurations associated with the first operation mode. However, in a second operation mode, which is different from the first operation mode, different sets of configurations, which may, for example, relate to parameters 210A, 210B, 210C; 240A; 280A, 280B; 290A, 290B; 292A, 292B associated with the CPU 210, the bus interface 240, memory 280 and peripheral units 290, 292 may be defined. In the second operation mode, the remainder of said operational unit configuration parameters (i.e., the absolute complement of parameters 210A, 210B, 210C; 240A; 280A, 280B; 290A, 290B; 292A, 292B) may be configured using pre-defined configurations associated with the second operation mode. As becomes apparent, which operational units of the microcontroller system are configured by the sets of configuration data can be different based on the operation mode. This provides simplification and flexibility in handling configurations of the microcontroller system so that the programmer of the microcontroller system is able to take an application-centric view on configuration.

As becomes obvious, by the features as described above, the development of an application can significantly be simplified for an application programmer using a microcontroller system. For example, in a first stage of a design process, the operation modes for an application may be defined. This may be guided by defining a functional scope for each operation mode. In the second stage of a design process, sets of configuration data can be defined related to those operational units that are of particular interest for an application. For example, there may be operational units of the microcontroller system that are responsible for the major part of energy consumption, depending on the application. Hence, in these examples, some of the sets of configuration data may address configurations of those "hotspots". Since those parameters are associated with the operation mode, sets of configuration data can be defined related to this operation mode to fine-tune energy consumption of those "hotspot" operational units. Moreover, other operational units which are not critical to energy consumption may be defined using pre-defined values within one or more operation modes, even though specific fine tuning may provide some gains in terms of energy consumption. However, in order to reduce design complexity, those gains may be traded off by choice of the application designer. Moreover, for example, training sequences or execution observation may be implemented for optimizing the system energy consumption during run-time, at design or test at engineering level. An important aspect of optimizing the energy consumption may be related to the time of execution. The result of training and observation may be used to modify the sets of configuration data or the definition of operating modes. The results may be used i.e. to modify the sets of configuration data in the memory and/or the pre-defined settings used for defining the operation modes.

In some aspects of the present disclosure, the set of configuration data may be determined at least in part on event execution control data associated with the event. In some implementations, any information that is available at the time when the event is received can be used as execution control data. For example, event execution control data may be data that is received with the event or may be otherwise available at the time instant when the event is received. As a more specific example, an event signal may comprise an event vector identifying the event, and including a pointer pointing toward a program counter of an event service routine. The event vector may further include arguments (e.g., parameters) for configuring the event. In some aspects, techniques according to the present disclosure may include determining the set of configuration data based on the address and the arguments of the event vector.

As an exemplary example, said event execution control data may comprise information associated with a duration until returning from the event. This information may be used for deciding whether to alter the present system configuration, or to stay with the configuration that was active upon receiving the event. For example, the duration until returning from the event may be shorter than a particular defined threshold value. In the latter case, it may not be worthwhile changing the system configuration. In other cases, the duration until returning from the event may be expected to exceed the threshold value. Therefore, in order to optimize energy consumption, it may be worthwhile defining or selecting a different set of configuration data for servicing the event.

In some aspects according to the present disclosure, the event execution control data may include system state information associated with the execution status of the microcontroller system. Execution status information may be associated with information characterizing an inner state of the system at the time when the event arrives. Examples of such data may be the content of program status registers, condition code registers, the program stack storing return data, peripheral unit status, i.e., data needed to continue the interrupted process after the event is served, etc.

In some aspects according to the present disclosure, the system state information includes a system configuration active upon receiving the event. In some examples, this information may be stored on a stack for serving the event, in order to return to the system configuration that was active upon receiving the event. In some cases, the system configuration that was active upon receiving the event may provide sufficient resources for serving the event. In in these cases, it may be useful not to change the configuration of the microcontroller system for serving the event, in order to save execution time. On the other hand, in other cases, the system configuration that was active upon receiving the event may not provide sufficient resources for serving the event. Hence, for serving the event, for example, some operational units of the microcontroller system shall be properly configured. Hence, an appropriate set of configuration data may be determined for serving the event.

In other implementations, information associated with a duration until returning from the event may be provided in addition to the information related to the system configuration active upon receiving the event, as described above. In this case, the configuration that was active upon receiving the event may be used for serving the event when the expected duration until returning from the event is less than a defined threshold value, if the respective system configuration provides sufficient resources for serving the event. In other cases, a set of configuration data related to an appropriate configuration may be determined for serving the event.

In some aspects according to the present disclosure, program code associated with an event service routine for handling the event and said sets of configuration data is stored in respective portions of the memory 220, 225, 280, wherein a memory address for collecting said sets of configuration data is based on an event vector associated with said event. In some examples, the memory address for collecting the one or a plurality of sets of configuration data from the memory as explained above may be derivable from the event vector, so that collection of the sets of configuration data can be accelerated. Furthermore, it is to be appreciated that the configuration data need not be stored in a register, which is rather expensive. Rather, for storing the configuration data, the same type of memory which is also used for storing the event entry pointer and/or code of the event service routine can be used. This enables an inexpensive design for different configurations of the system. Furthermore, the set of configuration data in the memory can be changed in case of a software or hardware modification by changing the data in the memory without executing a dedicated step to store new configuration data in a register.

According to some aspects of the present disclosure, the program code associated with an event service routine for handling the event and the sets of configuration data is stored in contiguous portions of the memory. In these aspects, the memory location of the system setting information can be easily derived, e.g., from the program counter pointing toward the block of memory locations. Furthermore, the sets of configuration data can be loaded from the memory together with the program instructions of the event service routine e.g., by using a burst read mode, which accelerates reception of the system setting information associated with the one or more operation modes. Moreover, by storing the sets of configuration data together with the respective program code, the related sets of configuration data can be included in a simple fashion, when a new application or other function is downloaded and installed on the microcontroller system.

According to aspects of the present disclosure, the collecting one or a plurality of sets of configuration data comprises collecting one or a plurality of sets of configuration data from the memory based on at least one pointer pointing toward at least one set of configuration data stored in a portion of the memory. In some implementations, the amount of data to be collected may be large. In these situations, it may be desirable to reduce the amount of data that has to be retrieved from memory 220, 225 or 280 during the collection. Hence, instead of physically collecting the data, only a pointer may be received or derived, which points towards the configuration data. In some examples, a single pointer may be obtained pointing towards a contiguous portion of the memory storing the sets of configuration data. In these examples, an offset may be determined upon determining a set of configuration data of the sets of configuration data that is used for configuring the microcontroller system. In other examples, pointers to individual sets of configuration data may be obtained or derived. In these examples, a pointer pointing toward the particular set of configuration data may be selected upon determining a set of configuration data of the sets of configuration data.

In some aspects according to the present disclosure, the memory at least in part is a cache memory (225). A cache is a component that stores data so that future requests for that data can be served faster. The data stored in a cache might be the results of an earlier computation or collecting of one or a plurality of sets of configuration data, or the duplicates of data stored elsewhere. For example, the sets of configuration data may be dependent on the same event that may arrive several times in a series. Then, instead of collecting the sets of configuration data from a main memory, a fast cache memory can be used for retrieving the system setting information.

According to some aspects, the techniques described herein may further include altering the operation mode associated with the microcontroller system and collecting the one or the plurality of sets of configuration data from said memory based on the altered operation mode. According to these examples, the operation mode may optionally be altered, and configuration data associated with the altered operation mode may be collected from the memory. As mentioned above, the operation mode may define a scope of function or operation of the microcontroller system. For example, execution of an event may require transition of the operation mode from a sleep mode to an active mode, which configures the appropriate operational units for servicing the event. In other examples, the event itself may serve for transition to an altered operation mode. In these examples, the respective operational units may be configured according to the altered operation mode, e.g., by using a pre-defined configuration, as explained above. In some examples the altered operation mode may change levels of protection and/or access rights of operational units. In these examples, the structure of the sets of configuration data may be not be different in the altered operation mode. Hence, in the altered operation mode, the same sets of configuration data may be used as in the previous operation mode. In other examples, in the altered operation mode, different sets of configuration data compared to the previous operation mode may apply. In these cases, altering the operation mode includes using other sets of configuration data as well as changing the pre-determined configuration of some of the operational units. In some aspects, changing the pre-determined configuration related to some of the operational units may be provided by the configuration control means 255. However, any other unit arranged for altering the configuration of the operational units may be used.

In some aspects of the disclosure, the techniques described herein include executing an event service routine for handling the event (e.g., after configuring the microcontroller system corresponding to the determined set of configuration data). The event service routine (ESR) is the software module that may be executed upon receiving an event in order to conduct a specific task associated with the event. The teachings according to the present disclosure permit to execute the event service routine within an appropriate configuration of the microcontroller system, as described above. In some examples, the ESR may be performed by a hardware-based or hardware-supported process. In an example, an event may trigger a direct memory access (DMA) which transfers data from memory 280 to an operational unit. This data may provide input data and execution information to the hardware of the operational unit (e.g., a programmable logic), which executes a hardware process based on the received input data and execution information.

In some aspects of the disclosure, the techniques described herein include returning from said event. Some examples may include returning from the event after execution of the event service routine for handling the event. In these cases, as described above, the microcontroller system may be configured by collecting the plurality of sets of configuration data, determining a set of configuration data to be applied, configuring the microcontroller according to the determined set of configuration data before executing the event service routine for handling the event. In some of those examples, as will be described in more detail below, the configuration that was active upon receiving the event (i.e., the configuration of the microcontroller to execute the process before the event has been received) is restored before returning from the event. However, other examples may include returning from the event without restoring the configuration that was active before receiving the event. In these examples, the event may serve to re-configure the system in addition to executing the event service routine. For example, the event may be first one of a series of events usually arriving in short time one after the other that require a specific configuration of the system for servicing the event. However, as those events usually arrive in series within a short time period, it may not be useful returning from each event by re-activating the other configuration active before the series of events arrived. However, other examples may include returning from the event without execution of the event service routine for handling the event (e.g., after configuring the microcontroller system corresponding to the determined set of configuration data). In these cases, the microcontroller event may only serve to configure the system according to a set of configuration data, as described above, without executing an event service routine. As an example, a specific event, or a specific version of an event may be used to configure the microcontroller system to scale down supply voltage and/or clock frequency at the end of a series of events requiring a higher performance of some operational units.

In some aspects, techniques as disclosed herein include saving system configuration information associated with a system configuration active upon receiving the event, executing an event service routine for handling the event, restoring said system configuration information associated with a system configuration active upon receiving the event, configuring the microcontroller system corresponding to said restored system configuration information, configuring the microcontroller system corresponding to said restored system configuration information, and returning from the event.

Whereas, in some examples as discussed above, the configuration is not restored to the configuration that was active upon receiving the event after returning, in the latter aspects, in contrast, it may be useful to restore the configuration that was active upon receiving the event. In these cases, information associated with the system configuration active upon receiving the event should be stored before configuring the microcontroller system corresponding to the determined set of configuration data, in order to restore the previous configuration. As mentioned, in some aspects, the sets of configuration data may define a configuration related to only a small number of operational units, and the sets of configuration data may define configurations of a strict subset of the operational unit configuration parameters related to those operational units, whereas a pre-determined configuration is used for other operational units and the respective complement set. In those cases, only those parts of the configuration information which is changed by the set of configuration data after receiving the event, has to be stored and recovered before returning from the event.

In some aspects, techniques as disclosed herein include executing an event service routine for handling the event (e.g., after configuring the microcontroller system corresponding to the determined set of configuration data), after execution of said event service routine, determining a set of configuration data of the sets of configuration data for returning from the event. These examples may further include configuring the microcontroller system corresponding to the determined set of configuration data for returning from the event, and returning from said event. As can be seen, in these examples, after executing the event service routine, instead of returning to the previous configuration, a new configuration is established which is still active after receiving from the event. Hence, according to an option, the system needs not to return to the previous configuration, but a new configuration for further operation of the microcontroller system can be established. It should be appreciated that in those cases, it is not necessary to store configuration information associated with a system configuration active upon receiving the event.

In some aspects, techniques as disclosed herein include executing an event service routine for handling the event, and after execution of said event service routine, altering the operation mode associated with the microcontroller system. As an option, techniques may further include collecting one or a plurality of sets of configuration data from said memory based on said altered operation mode, determining a set of configuration data of the sets of configuration data associated with the altered operation mode, and configuring the microcontroller system (200) corresponding to said determined set of configuration data associated with the altered operation mode.

By applying such techniques, an event service routine may be executed after configuring the microcontroller system according to a determined set of configuration data in a first operation mode, and then, after executing the event service routine, a second (i.e., altered) operation mode is established. By altering the operation mode, the system may be configured differently using pre-defined configurations, as explained above. Optionally, a configuration in the altered operation mode may be applied to the microcontroller system based on sets of configuration data based on the altered operation mode. As a next step, the microcontroller system may return from the event. In this case, the technique enables altering the operation mode after executing an event service routine. Alternatively, as a next step, also a further (e.g., a different) event service routine may be executed before returning from the event. Hence, it is possible to alter the operation mode during execution of one or more software modules that may be executed upon receiving an event in order to conduct a specific task associated with the event.

In some aspects according to the present disclosure, the event may be associated with an event service routine for handling the event that expects a response signal for verifying system conditions based on a predetermined condition. Such a predetermined condition may include, for example, the status of the system (i.e. the settling condition of an analog circuit i.e. a comparator after it is powered), an external signal (i.e. USB cable still connected) or external data (data applied to pins define device functions, software execution), and may include a predetermined duration of time. This may be useful for time-sensitive events. Such events may use a watchdog timer in order to verify that the system is still running properly. Furthermore, such events may expect a response from operational units of the microcontroller system within a specified time window. However, in case of a faulty system, e.g., a system being in a deadlock situation, it may be desirable to configure the system into a safe operation mode. In such cases, techniques according to the present disclosure may include saving system configuration information associated with a system configuration active upon receiving the event and executing the event service routine. When the expected response signal is received based on the predetermined condition, techniques may include restoring said system configuration information associated with a system configuration active upon receiving the event, configuring the microcontroller system corresponding to said restored system configuration information, and returning from said event. This may relate to an operation where no fault condition is detected. However, when the expected response signal is not received based on the predetermined condition, techniques may further include determining and/or activating an operation mode for returning from the event associated with a safe operation of the microcontroller system. As an option, the techniques may further include collecting one or a plurality of sets of configuration data from said memory based on the determined operation mode associated with the safe operation, determining a set of configuration data of the sets of configuration data associated with the operation mode associated with the safe operation, configuring the microcontroller system 200 corresponding to said determined set of configuration data associated with the operation mode associated with the safe operation, and returning from the event. Hence, in case a fault condition is detected, techniques as described above may be configured to transition the system into a state of safe operation. In some examples, in the operation mode associated with a safe operation of the microcontroller system, portions of the memory, or at least one operational unit may be configured with special access rights to reboot the system. In some examples, the techniques as described herein may include triggering a reboot by execution of some emergency routines, such as a TRAP, when the expected response signal is not received based on the predetermined condition.

Figure 3:
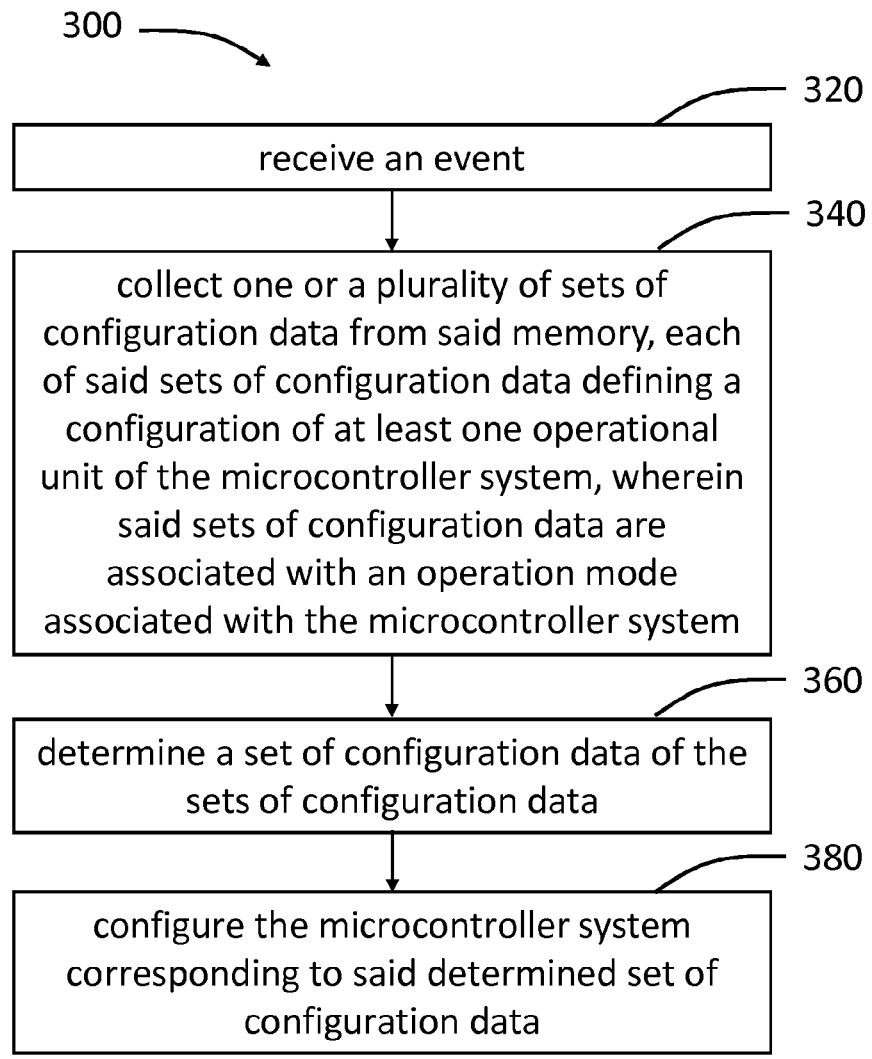
FIG. 3 is a block diagram illustrating a method according to aspects of the present disclosure.

FIG. 3 shows a block diagram illustrating a method according to aspects of the present disclosure. In some embodiments, the method 300 may be performed by portions of the microcontroller system as shown in FIG. 2, for example, by event control means 250 and configuration control means 255, as explained above. However, the invention may not be limited thereto. The method 300 includes receiving an event at 320. Furthermore, at 340, the method comprises collecting one or a plurality of sets of configuration data from said memory, wherein each of said sets of configuration data defines a configuration of at least one operational unit of the microcontroller system. According to aspects, the sets of configuration data are associated with an operation mode associated with the microcontroller system. At 360, the method further comprises determining a set of configuration data of the sets of configuration data. At 380, the method includes configuring the microcontroller system 200 corresponding to the determined set of configuration data.

As explained in detail above with respect to an exemplary example of a microcontroller system 200, by using the method as explained above, the user of the microcontroller system can concentrate configuring those operational units of interest, thereby simplifying the definition of configuration of the microcontroller system. Moreover, in some examples, more than one configuration within one operation mode can be established. Embodiments of the method therefore offer flexible and improved handling of microcontroller system configurations, in particular in terms of energy consumption and/or safe operation.

Figure 4:
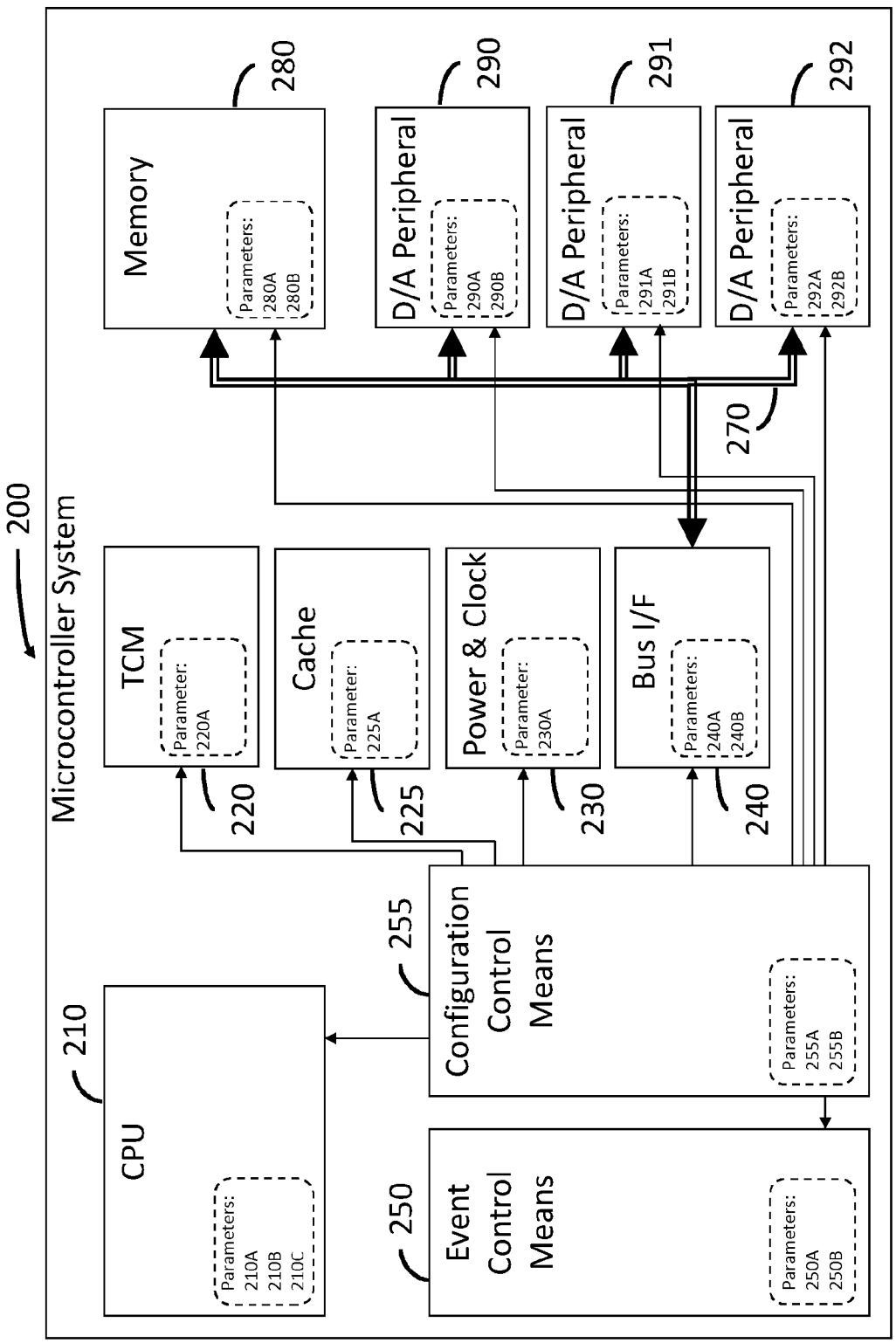
FIG. 4 illustrates a simplified diagram of the microcontroller system according to FIG. 2 in more detail, according to aspects of the present disclosure.

FIG. 4 illustrates a simplified diagram of the microcontroller system according to FIG. 2 in more detail, according to aspects of the present disclosure. More specifically, in the example according to FIG. 4, parameters required to configure the operational units of the microcontroller system 200 as shown in FIG. 2 are additionally illustrated. In this example, CPU 210 is configurable by means of parameters 210A, 210B, 210C. For example, parameter 210A may be a level of the power supply voltage for CPU 210, parameter 210B may be a clock frequency associated with CPU 210, and parameter 210C may configure, for example, access rights to registers of CPU 210. Furthermore, in the present example, TCM 220 may be configurable by parameter 220A, cache 225 may be configurable by parameter 225A, power and clock unit 230 may be configurable by parameter 230A, bus interface 240 may be configurable by parameters 240A and 240B, event control means 250 may be configurable by parameters 250A and 250B, memory 280 may be configurable by parameters 280A and 280B, and digital/analog peripherals 290, 291 and 292 may be configurable by parameters 290A, 290B, 291A, 291B, 292A and 292B, respectively, as illustrated in FIG. 4. In a similar manner, as pointed out above with respect to CPU 210, the parameters of the operational units 220, 225, 230, 240, 250, 255, 280, 290, 291 and 292 may relate to configuration of energy consumption and/or safe operation of the microcontroller system. It has to be appreciated that the parameters as mentioned above are only examples of parameters for configuring CPU 210 and the other operational units 220, 225, 230, 240, 250, 255, 280, 290, 291 and 292 of the microcontroller system 200, in order to illustrate the concept according to the present disclosure. This shall be in no way understood as limiting the scope of the present invention. Rather, each operational unit of the microcontroller system 200 may be configurable by one or more parameters, respectively. It should be further be noted that the microcontroller system in this respect is not limited to the operational units as illustrated in FIGS. 2 and 4. Rather, a microcontroller system may include any number of operational units, wherein each unit may be configurable by one or more parameters.

In an example, the microcontroller system may operate in a first operation mode. More specifically, in this operation mode, CPU 210, power and clock unit 230, bus interface 240, event control means 250, configuration control means 255, memory 280, and digital/analog peripherals 290 and 291 may be active, whereas other operational units, such as TCM 220, cache 225, and digital/analog peripheral unit 292 are not operating, and therefore powered off.

In the first operation mode, different events may be receivable, such as event #1, event #2, and event #3. Event control means 250 may monitor for incoming events. However, in this example, based on the first operation mode, event control means 250 may only accept events that are one of event #1, event #2, and event #3. As mentioned, in the first operation mode, TCM 220, cache 225 and digital/analog peripheral 292 may be inactivated. Therefore, in this example, those parameters may be assigned to a default set of parameter configuration (e.g., parameter values) in the first operation mode that inactivates those operational units. Moreover, in the first operation mode, the configuration of power and clock unit 230, event control means 250, and configuration control means 255 may be the same for all of events #1, #2 and #3. Therefore, in this example, a pre-defined configuration may apply for these units. Furthermore, in this example, also parameter 210C related to the CPU may have the same configuration in the first operation mode for all related events. Hence, also parameter 210C may be assigned a pre-defined configuration based on the first operation mode. Furthermore, in this example, pre-defined configurations may also be available for parameters 240A and 240B, configuring the bus interface 240, and for parameters 280A and 280B, configuring memory 280. However, as will be explained in the following, event #2 may require a configuration of parameters 240A and 240B that deviates from the pre-defined configuration, but event #2 may use a pre-defined configuration for peripheral unit 291. Furthermore, event #3 may require a configuration of parameters 280A and 280B that deviates from the pre-defined configuration, but no configuration for peripheral unit 290 is required. Hence, based on the first operation mode, pre-defined configurations may be available at least for parameters {210C, 220A, 225A, 230A, 240A, 240B, 250A, 250B, 255A, 255B, 280A, 280B, 291A, 291B, 292A}.

It should be remarked that, when an operational unit is inactivated, for example digital/analog peripheral 292, it may be sufficient to configure one parameter switching the respective operational unit off. In the present example, digital/analog peripheral 292 may be powered off by an appropriate setting of parameter 292A. In case digital/analog peripheral 292 is switched off, configuration of parameter 292B may be irrelevant and need not be configured. For this reason, the above set, for example, may not include a pre-defined setting for parameter 292B.

In the present example, CPU 210, bus interface 240, memory 280, and digital/analog peripherals 290 and 291 may require configurations which may be different for events #1, #2 and #3. Hence, those parameters may be configured differently, e.g., based on the event. In the present example, the particular configuration may also be dependent on event execution data, in order to obtain more flexibility. For example, upon arrival of event #1, two different power levels related to the power supply voltage (e.g., parameter 210A) and the clock speed (e.g., parameter 210B) may be applicable, dependent on a requested performance of CPU 210. However, upon arrival of events #2 or #3, different values of parameter configurations may be useful. Therefore, different parameter values 210A-1, 210A-2, 210A-3, 210A-4, 210B-1, 210B-2, 210B-3 and 210B-4 may be provided for configuring parameters 210A and 210B of CPU 210, respectively. Similarly, for bus interface 240 parameter values 240A-1, 240A-2, 240B-1 and 240B-2 may be provided, as those values apply to event #3, and digital/analog peripherals 290 and 291 may be configured by different parameter value configurations 290A-1, 290A-2, 290B-1, 290B-2, 291A-1, 291A-2, 291B-1, 291B-2, respectively. In an example, different performance of the microcontroller system may be required dependent on whether one of events #1. #2 or #3 is triggered by any of two applications (e.g., software threads) running in parallel on the microcontroller system. Not all possible combinations of the parameters may be useful. For example, for event #2, a certain CPU clock speed may require a certain bus speed to optimize performance and energy consumption. Hence, in this example, sets of configuration data may be defined by values configuration data set #1={210A-1, 210B-1, 290A-1, 290B-1, 291A-1, 291B-2};
configuration data set #2={210A-2, 210B-1, 290A-2, 290B-2, 291A-2, 291B-2};
configuration data set #3={210A-3, 210B-3, 240A-2, 240B-2, 290A-2, 290B-1};
configuration data set #4={210A-4, 210B-4, 240A-1, 240B-2, 290A-2, 290B-2};
configuration data set #5={210A-3, 210B-1, 280A-2, 280B-2, 291A-1, 291B-2};
configuration data set #6={210A-2, 210B-3, 280A-1, 280B-1, 291A-2, 291B-2};

Configuration data sets #1, #2, #3, #4, #5 and #6 may be stored in a portion of memory 280 of microcontroller system 200, as, in this example, memory 280 is activated in the first operation mode. However, other locations for storing configuration data sets may be in TCM 220 and/or in cache 225, when appropriate. In this example, configuration data sets #1 and #2 may be applicable for event #1, data sets #3 and #4 may be applicable for event #2, and data sets #5 and #6 may be applicable for event #3. In one example, configuration data sets #1 to #6 may be collected and stored in a register of CPU 210 upon entering the first operation mode. However, in an alternative example, the collecting of the configuration data sets may occur in reaction to receiving one of events #1, #2, or #3. In these cases, only those configuration data sets that are applicable to the respective event may be collected.

In the present example, upon arrival of an event, say, for example, event #2, configuration data sets #3 and #4 may be available. However, which one of configuration data sets #3 or #4 may be used, may be determined based on information available at the time when the event is received, or before executing an event service routine. In the present example, event execution data may include an application identifier identifying either a software thread associated with the first application or a thread associated with the second application that triggered event #2. In the present case, for example, configuration data set #3 is selected, because event #2 has been triggered by the first of two applications running on the microcontroller system. In a further step, configuration control means 255 may configure the respective operational units 210, 240, and 290 based on configuration data set #3. As mentioned, even though a pre-selected configuration is available for parameters 240A and 240B, bus I/F 240 is configured by the respective parameters according to configuration data set #3. As can be seen in the present example, the sets of parameters that have to be defined and require attention of the application designer in a particular operation mode is reduced, since default values can be applied for values that do not change for different configurations. On the other hand, flexibility in configuring the microcontroller system within an operational mode is provided.

In some examples, the collecting of configuration data sets #1, #2, #3, #4, #5 and #6 may be accomplished by retrieving pointers pointing toward configuration data sets #1, #2, #3, #4, #5 and #6 in memory 280, respectively. In other examples, the configuration data sets may be stored in contiguous portions of memory 280. In these cases, it is sufficient to retrieve a single pointer pointing toward configuration data set #1 for collecting the sets of configuration data. Configuration data sets #2, #3, #4, #5 and #6 may be accessed upon determining a set of configuration data by a known offset relative to the pointer.

Figure 5:
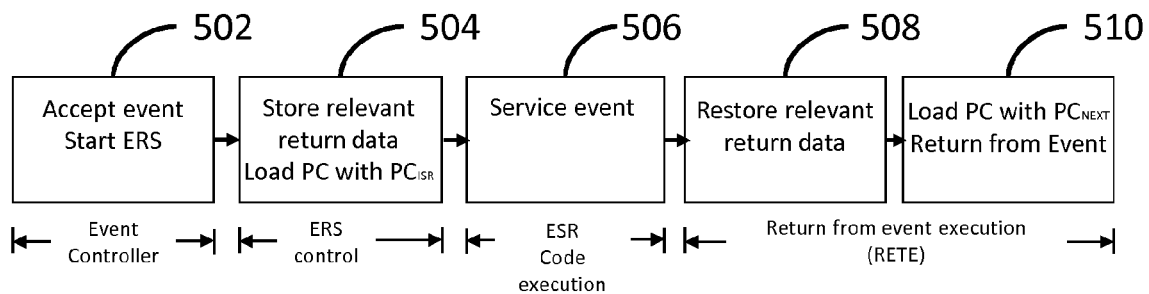
FIG. 5 shows a block diagram illustrating the stages performed by the microcontroller system in processing an event according to aspects of the present disclosure.

Referring now to FIG. 5, a block diagram is shown illustrating the stages performed by the microcontroller system in processing an event using the techniques according to aspects of the present disclosure.

Upon arrival of an event 202 (see FIG. 2), processing of the event starts with stage 502. This stage may be executed by event control means 250 of the microcontroller system 200 as shown in FIG. 2. When the event is accepted, the process is further executed by the event request service (ERS) control stage 504. The ERS control stage switches from execution of the process that was present when the event arrived to the execution event service routine (ESR) for handling the event. The steps performed during the ERS control stage may be implemented by a hardware state machine in the event control means 250 and/or in the operation mode control means 255, or in any other operational unit of the microcontroller system. In some examples, the ERS control stage 504 may be provided as an atomic process. In an atomic process, the steps performed by the state machine are performed in an atomic manner, i.e., the procedure is, when initiated, then executed without being interrupted by any intervention from software (e.g., an operating system, software events, etc.), or some other hardware. In this way, data that is involved in an atomic process cannot be corrupted, thereby ensuring safe operation. Atomic operation is in particular of advantage when a processing condition is in change, i.e., during switching from execution of a previous process to servicing the event, changing the configuration of an operational unit, e.g., by transitioning from one operation mode into another, or by configuring the microcontroller system according to a determined set of configuration data, etc., as discussed above.

In order to switch from execution of the process that was present upon arrival of the event, the ERS control stage 504 may stop the latter process and save all information that is necessary for restoring the execution after returning from the event. This data may be denoted as return data. The return data includes, for example, the program counter (PC) of the process executed upon receiving the event pointing toward the instruction that is to be executed next, the status register or registers (SR) of the CPU, including the processor status word (PSW). The return data may also include the present pointer to the stack. In some designs, all CPU registers may be stored as well, even though they may not be touched during execution of the interrupt service routine. The return data may be stored on a stack memory configured in memory 220 or 280, respectively. In some embodiments, the CPU itself may include memory for the stack. The stack pointer is updated accordingly. Furthermore, in order to execute the event service routine (ESR), the program counter of the CPU may be loaded with the program counter $PC_{ESR}$ of the event service routine pointing toward the first instruction thereof.

In order to implement the concept according to the present disclosure, the ERS control stage may also include the ability to change from a system configuration active upon receiving the event to a new system configuration. In order to provide the ability to return to the configuration that was active upon receiving the event, the respective system configuration may be saved. In some embodiments, a stack memory may be used for saving the system configuration information. This may be the CPU stack as mentioned above, or a separate stack. After saving the system configuration information of the configuration that was active upon receiving the event, the ERS control stage may collect one or a plurality of sets of configuration data from memory 220, 225 or 280, e.g., as defined in step 340 of FIG. 3. Moreover, the ERS control stage may determine a set of configuration data of the sets of configuration data as defined in step 360 of FIG. 3. Furthermore, the ERS control stage 504 may configure the microcontroller system 200 corresponding to the determined set of configuration data, as defined in step 360 of FIG. 3. The ERS control stage may further trigger execution of the event service routine (ESR) 506 in order to service the event.

As mentioned above, the advantage of implementing the operation of the operation mode controller within the boundaries of atomic operation related to the ERS control stage is that execution of this stage cannot be disrupted, and the respective data cannot be corrupted by some faulty conditions that may occur when storage process 504 is interrupted by another process. For example, the latency to start with the ESR 506 may be minimized by having a well-defined number of data to be stored during storage process 504, e.g., all CPU registers. The restoring process 408 may also rely on correct return data and correct number of return data so that the return process is correctly executed. However, for example, in case the storage process 504 is interrupted by another process, a faulty condition, as mentioned above, would occur. In this case, the interrupting process may have no indication that the storage process is still in progress. This may end in an unsafe operation in a critical scenario that may even be hard to identify. In order to avoid such faulty conditions, in some examples, at least the steps according to boxes 340, 360 and 380 as explained with respect to FIG. 3 are performed within the boundaries of atomic operation, initiated by configuration control means 255 and/or the event control means 250 without any intervention of an operating system. Some examples may also include the steps of saving system configuration information associated with a system configuration active upon receiving the event and the execution of the event service routine within the atomic operation boundaries of the ERS control stage 504. Furthermore, in some examples, the entire process triggered by receiving the event until returning from the event may be within the boundaries of atomic operation, to conduct event service in an energy and performance efficient way. In other examples, atomic operation may be divided into multiple parts of atomic operations, which reduces latency, as the portions underlying atomic operations may be fix by implementation or be controlled by configuration control means. Such divided atomic operation may be useful to ensure that all steps are executed in the required sequence and in the required configuration. Stage 506 in FIG. 5 is the execution stage of the event service routine. During this stage, the event is serviced using the configuration of the microcontroller system as described above.

After execution of the event service routine is finished, the processor state of the process that was active upon receiving the event may be restored in order to continue execution of the latter process. In microcontroller systems, the return data as mentioned above, e.g. the program counter of the process executed upon receiving the event, the status register or registers of the CPU, including the processor status word, etc., may be restored from the stack or the stacks in order to switch from execution of the event service routine to continue the process executed by the microcontroller system 200 that was present upon receiving the event. This is performed during the return from event (RETE) stages 508 and 510. In stage 508, the return data as described above is restored. During stage 510, the program counter is loaded with the next instruction $PC_{NEXT}$ of the program flow of the process to be returned to.

In order to implement the techniques as described above, the RETE stages 508 and 510 may also include the ability to restore the system configuration active upon receiving the event. In this respect, in some embodiments, e.g., RETE stage 508 may also include restoring the configuration information associated with the system configuration active upon receiving the event, and e.g., RETE stage 510 may also include configuring the microcontroller system corresponding to the system configuration active upon receiving the event, as described above. The return from event stages 508 and 510 including the restauration of the system configuration as described may be implemented by the configuration control means 255 and/or the event control means 250 using an atomic process that is initiated without any intervention of an operating system and cannot be interrupted within the boundaries of atomic operation, as discussed above.

In some examples, returning from the configuration associated with the event may be disabled. In these cases, ERS control stage 504 may not perform saving system configuration information of the system configuration active upon receiving the event, at least in cases where at the time of occurrence of the event it is known that a return to the previous system configuration is not intended. Furthermore, in some examples, the RETE stages 508 and 510 may skip restoring the system configuration information associated with the system configuration active upon receiving the event. However, in other examples, before returning from the event, a new system configuration may be activated, using the techniques as described above. In this case, e.g., RETE stage 508 may determine a set of configuration data of the sets of configuration data for returning from the event, and RETE stage 510 may include configuring the microcontroller system 200 corresponding to the respective set of system setting information. Furthermore, as described above, the operation mode may be altered, and a new configuration based on the altered operation mode may be established before returning. The steps according to these examples may be performed within the boundaries of atomic operation related to the RETE stages 508 and 510.

Figure 6:
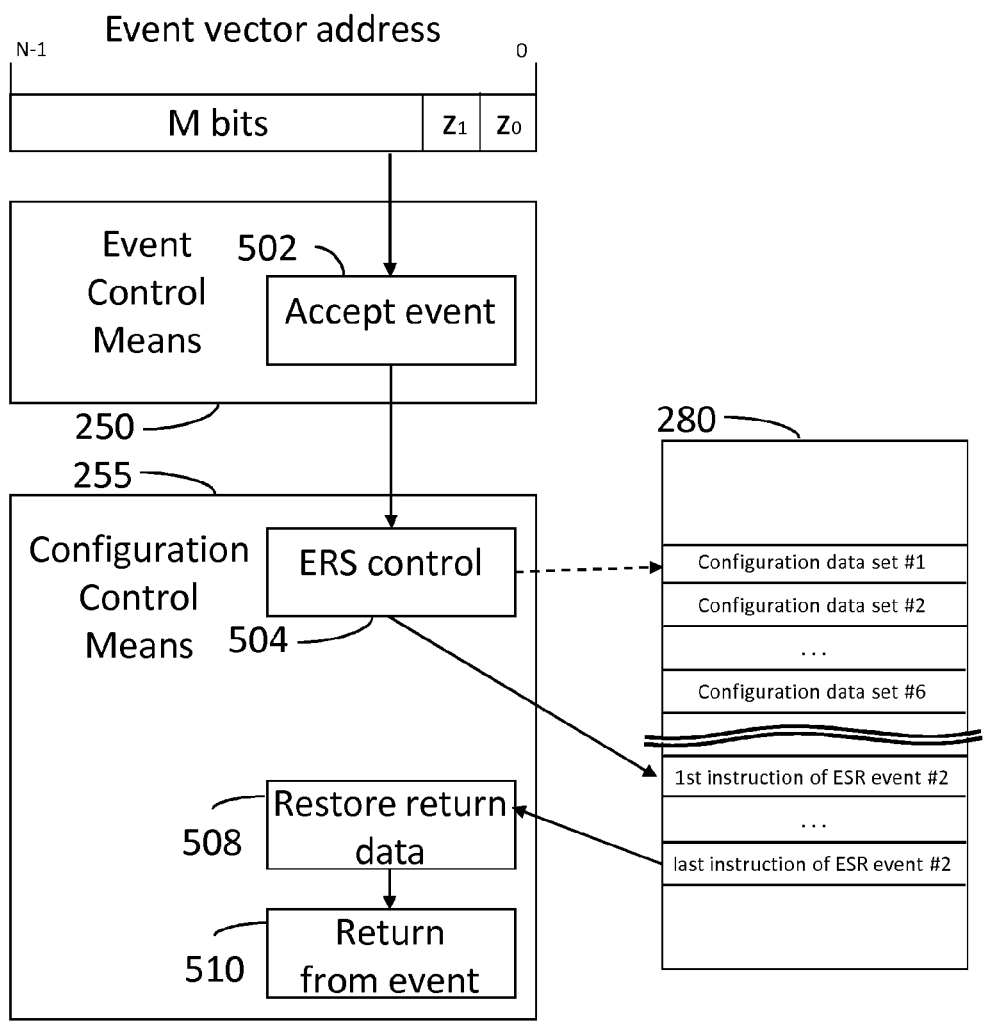
FIG. 6 illustrates processing of an event according to an example technique according to aspects of the present disclosure.

FIG. 6 schematically illustrates processing of an event according to an example technique related to aspects of the present disclosure. According to this example, an event may arrive having an event vector of length N bits as illustrated in FIG. 6. In this example, the most significant M bits may be used as the effective program counter address $PC_{ESR}$ pointing toward the first instruction of the event service routine (ESR). In this example, the event vector address may additionally comprise two selector bits $z_0$ and $z_1$, which may be regarded as arguments of the event vector.

For processing of the event, in this example, event control means 250 may accept the event by executing control stage 502, as explained above. Further, in the present example, configuration control means 255 may execute ERS control stage 504. As explained above, in stage 504 all information that is necessary for restoring the execution after returning from the event may be saved. Furthermore, stage 504 includes the collecting of the sets of configuration data. In this example, configuration data sets #1, to #6 as explained in relation with FIG. 4 are collected by configuration control means 255 from memory 280, as illustrated in FIG. 6. In the present example, configuration data sets #1, #2, #3, #4, #5 and #6 are stored in a portion of memory 280 which is separate from the location where the program data related to the event service routines are stored. This may be advantageous in cases where the configuration data sets may apply to different events, selector bits, event parameters, etc.

In some examples, collecting configuration data sets may include retrieving the data from the memory and store the data in a register associated with configuration control means 255. Alternatively, as shown in FIG. 6, a pointer (illustrated by the dashed arrow in FIG. 6) is obtained that points toward the start address related to configuration data set #1. As the sets of configuration data are associated with an operation mode, such a pointer may be known from a configuration of configuration control means 255 related to the respective operation mode. As a further alternative, respective pointers pointing toward configuration data sets #1, #2, #3, #4, #5 and #6 may be obtained.

Further in ERS control stage 504, a set of configuration data out of the sets#1, #2, #3, #4, #5 and #6 is determined. In the present example, this selection can be based on the selector bits $z_0$ and $z_1$. In an example, selector bits $z_0$ and $z_1$ may indicate a unit of program execution, e.g., a thread related to a specific application that triggered the event. However, selector bits $z_0$ and $z_1$ may also relate to other software units, such as hardware drivers that may have triggered the event. In other examples, the selection of a set of configuration data may also be based on the specific interrupt (for example, interrupt #2, as defined above). Additionally or alternatively, the selection may be based on arguments provided with the interrupt vector, such as information defining return and data transfer behavior, conditional code execution, execution level (i.e., execution priority), etc., or on any combination of information available by configuration control means 255 at the time of conducting ERS control stage 504.

ERS control stage 504 may further configure the microcontroller system 200 corresponding to the determined set of configuration data, as defined in step 360 of FIG. 3. The ERS control stage may further trigger execution of the event service routine (ESR) 506 in order to service the event. In the present example, the most significant M bits may be used as the effective address of the program counter address $PC_{ESR}$. In other embodiments, the most significant M bits may directly serve as the program counter address $PC_{ESR}$ pointing toward the first instruction of the event service routine (e.g., related to event #2) in memory 280. After executing the event service routine, RETE stages 508 and 510 may restore the system configuration active upon receiving the event, as explained above. Alternatively, the most significant M bits may point toward the set of configuration data. In this alternative, the address of the $PC_{ESR}$ or pointer to $PC_{ESR}$ may be derivable using a known offset.

Figure 7:
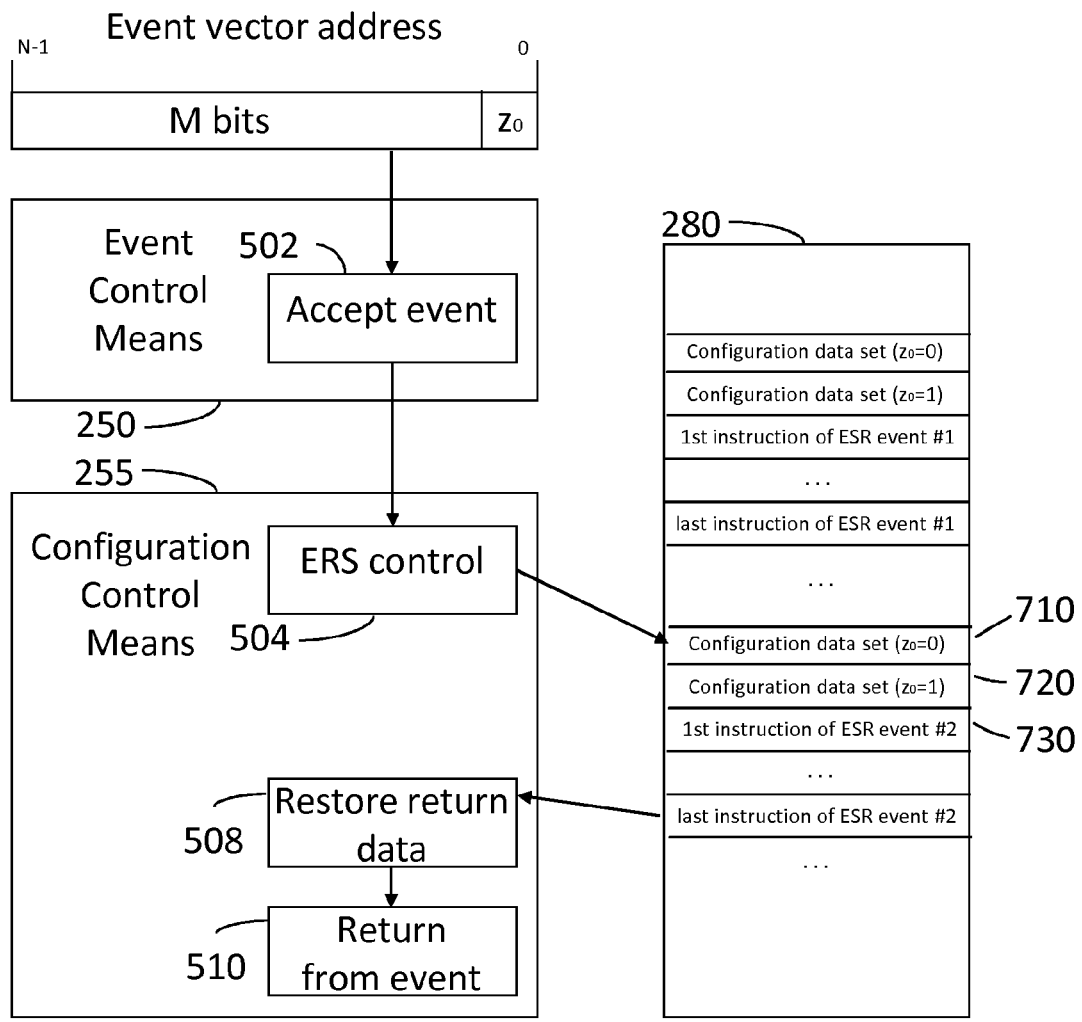
FIG. 7 illustrates processing of an event according to another example technique according to aspects of the present disclosure.

In the previous example, the sets of configuration data #1, #2, #3, #4, #5 and #6, and the program instructions related to the respective event service routines are stored in separate sections of memory 280. This may be advantageous in cases where one of the configuration data sets may apply to different events. However, in cases where each event shall be configured with different sets of configuration data, it may be useful to store the program instructions related to the event service routine and the sets of configuration data jointly in a consecutive section of the memory. FIG. 7 schematically illustrates processing of an event according to an example technique related to aspects of the present disclosure, where program code associated with an event service routine for handling the event the said sets of configuration data is stored in contiguous portions of the memory.

In this example, an event may arrive having an event vector of length N bits as illustrated in FIG. 7. The most significant M bits of the event vector may be used as the program counter address $PC_{ESR}$. However, as can be seen from FIG. 7, the program counter $PC_{ESR}$ does not directly point toward the first instruction of the event service routine (ESR). Rather, in this example, the code of each event service routine (e.g., ESRs related to event #1 and #2, as shown in FIG. 7) is preceded by configuration data sets associated with the event, respectively. Hence, in this example, the sets of configuration data and the program code related to the event service routine is stored in consecutive sections of memory 280. Furthermore, in this example, two configuration data sets are associated with each event. In this way, it is possible to assign different data individually based on the event. In the present example, the event vector address comprises one selector bit $z_0$, which is used to determine a set of configuration data of the two sets of configuration data in ERS control stage 504, accordingly, as explained above.

In this example, it is not necessary for ERS control stage 504 to retrieve the sets of configuration data and the instructions of the event service routine separately. Instead, the first M bits of the event vector address are used as a pointer pointing toward the first configuration data set. Furthermore, the length of the configuration data sets is known to configuration control means, for example by a configuration related to the respective operation mode. Therefore, ERS control stage 504 can derive the program counter $PC_{ESR}$ pointing toward the first instruction of the event service routine. For example, in FIG. 7, event #2 may have been received. Hence, a pointer pointing toward the first configuration data set 710 of the two sets of configuration data 710 and 720 may be derivable from the event vector address. ERS control stage 504 may, based on the event vector address, and the known length of the sets of configuration data 710 and 720 derive the program counter $PC_{ESR}$ pointing toward the first instruction 730 of event service routine associated with event #2. In an example, ERS control stage 504 may jointly retrieve configuration data sets 710 and 720, as well as at least a part of the program code related to event #2 from memory 280, using a block reading command. Such commands provide effective reading of the data from a memory.

In some aspects, the techniques as explained above may be implemented by a computer program comprising program instructions executable to implement all steps of the method. The computer program may be associated with a computer program product directly loadable into the internal memory of a digital computer, comprising software code portions for performing the steps of said method when said product is run on a computer. In some embodiments, corresponding functions of the computer program may be stored on computer-readable medium having computer-executable instructions adapted to cause the computer system to perform the method.

The various components, configurations, operations, portions, operational units, functional islands, operational modules, circuits, event control means, configuration control means, methods and steps, etc., have been described generally in terms of their functionality. Whether such functionality is implemented as hardware or processor executable instructions depends upon the particular application and design constraints imposed by the overall microcontroller system. Additionally, the various operations of methods described above may be performed by any suitable means capable of performing the operations, such as hardware and/or software components, circuits and/or modules. Any operation as illustrated above may be performed by corresponding functional means capable of performing the operations, such as event control means 250 and configuration control means 255. Skilled persons in the art may implement the described functionality in varying ways for each particular application, but such implementation decisions should not be interpreted as causing a departure from the scope of the present disclosure.

The invention claimed is:

1. A microcontroller system, comprising:
a central processing unit;
memory associated with said microcontroller system;
event receiving means configured to receive an event;
configuration control means configured to:
   collect a plurality of sets of configuration data that relate to the event from said memory, each of said sets of configuration data defining a configuration related to at least one operational unit of the microcontroller system, wherein said sets of configuration data are associated with a first operation mode associated with the microcontroller system;
   determine a set of configuration data of the sets of configuration data; and
   configure the microcontroller system corresponding to said determined set of configuration data.

2. The microcontroller system of claim 1, wherein the plurality of sets of configuration data defines the configuration of said at least one operational unit of the microcontroller system related to at least one of: power consumption and safe operation of the microcontroller system.

3. The microcontroller system of claim 1, wherein the microcontroller system comprises a plurality of operational units, and said plurality of operational units is configurable by a set of operational unit configuration parameters related to said plurality of operational units;
wherein in said first operation mode said sets of configuration data define configurations of a strict subset of said set of operational unit configuration parameters; and
wherein said configuration control means is configured to configure the parameters of the absolute complement of said strict subset using a pre-defined configuration.

4. The microcontroller system of claim 3, wherein said sets of configuration data in a different second operation mode define configurations of a second subset of said set of operational unit configuration parameters; and
wherein said configuration control means is configured to determine the set of configuration data based at least in part on event execution control data associated with the event.

5. The microcontroller system of claim 4, wherein, said event execution control data comprises system state information associated with the execution status of the microcontroller system.

6. The microcontroller system of claim 5, wherein said system state information includes a system configuration active upon receiving the event.

7. The microcontroller system of claim 1, wherein program code associated with an event service routine for handling the event and said sets of configuration data is stored in respective portions of the memory, wherein a memory address for collecting said sets of configuration data is based on an event vector associated with said event; and
wherein said program code associated with an event service routine for handling the event and said sets of configuration data is stored in contiguous portions of the memory.

8. The microcontroller system of claim 1, wherein said configuration control means is configured to collect the plurality of sets of configuration data from said memory based on at least one pointer pointing toward at least one set of configuration data stored in a portion of the memory;
wherein said memory at least in part is a cache memory; and
wherein said configuration control means is configured to alter the operation mode associated with the microcontroller system and to collect the plurality of sets of configuration data from said memory based on the altered operation mode.

9. The microcontroller system of claim 1, wherein said configuration control means is configured to execute an event service routine for handling the event; and
wherein said configuration control means is configured to return from said event.

10. The microcontroller system of claim 1, wherein said configuration control means is configured to:
save system configuration information associated with a system configuration active upon receiving the event;
execute an event service routine for handling the event;
restore said system configuration information associated with a system configuration active upon receiving the event;
configure the microcontroller system corresponding to said restored system configuration information; and
return from said event.

11. The microcontroller system of claim 1, wherein said configuration control means is configured to:
execute an event service routine for handling the event;
after execution of said event service routine, determine a set of configuration data of the sets of configuration data for returning from the event;
configure the microcontroller system corresponding to said determined set of configuration data for returning from the event; and
return from said event.

12. The microcontroller system of claim 1, wherein said configuration control means is configured to:
execute an event service routine for handling the event;
after execution of said event service routine, alter the operation mode associated with the microcontroller system.

13. The microcontroller system of claim 1, wherein the event is associated with an event service routine for handling the event that expects a response signal for verifying system conditions based on a predetermined condition, wherein said configuration control means is configured to:
save system configuration information associated with a system configuration active upon receiving the event;
execute the event service;
when the expected response signal is received based on the predetermined condition:
restore said system configuration information associated with a system configuration active upon receiving the event,
configure the microcontroller system corresponding to said restored system configuration information; and
return from said event;
when the expected response signal is not received based on the predetermined condition:
determine an operation mode for returning from the event associated with a safe operation of the microcontroller system; and
return from said event.

14. A method of configuring a microcontroller system comprising the steps of:
receiving an event;
collecting a plurality of sets of configuration data that relate to the event from a memory associated with said microcontroller system, each of said sets of configuration data defining a configuration related to at least one operational unit of the microcontroller system, wherein said sets of configuration data are associated with a first operation mode associated with the microcontroller system;
determining a set of configuration data of the sets of configuration data; and
configuring the microcontroller system corresponding to said determined set of configuration data.

15. The method of claim 14, wherein the microcontroller system comprises a plurality of operational units, and said plurality of operational units is configurable by a set of operational unit configuration parameters related to said plurality of operational units;
wherein in said first operation mode said sets of configuration data define configurations of a strict subset of said set of operational unit configuration parameters; and
wherein the method further comprises configuring the parameters of the absolute complement of said strict subset using a pre-defined configuration.

16. The method of claim 15, wherein said sets of configuration data in a different second operation mode define configurations of a second subset of said set of operational unit configuration parameters.

17. The method of claim 14, further comprising determining the set of configuration data based at least in part on event execution control data associated with the event.

18. The method of claim 17, wherein, said event execution control data comprises system state information associated with the execution status of the microcontroller system.

19. The method of claim 18, wherein said system state information includes a system configuration active upon receiving the event.

20. The method of claim 14, wherein program code associated with an event service routine for handling the event and said sets of configuration data is stored in respective portions of the memory, wherein a memory address for collecting said sets of configuration data is based on an event vector associated with said event.

21. The method of claim 20, wherein said program code associated with an event service routine for handling the event and said sets of configuration data is stored in contiguous portions of the memory.

22. The method of claim 14, wherein said collecting the plurality of sets of configuration data comprises collecting the plurality of sets of configuration data from said memory based on at least one pointer pointing toward at least one set of configuration data stored in a portion of the memory.

23. The method of claim 14, wherein said memory at least in part is a cache memory.

24. The method of claim 14, further comprising altering the operation mode associated with the microcontroller system and collecting the plurality of sets of configuration data from said memory based on the altered operation mode.

25. The method of claim 14, further comprising executing an event service routine for handling the event.

26. The method of claim 14, further comprising returning from said event.

27. The method of claim 14 further comprising:
saving system configuration information associated with a system configuration active upon receiving the event;
executing an event service routine for handling the event;
restoring said system configuration information associated with a system configuration active upon receiving the event;
configuring the microcontroller system corresponding to said restored system configuration information; and
returning from said event.

28. The method of claim 14, further comprising:
executing an event service routine for handling the event;
after execution of said event service routine, determining a set of configuration data of the sets of configuration data for returning from the event;
configuring the microcontroller system corresponding to said determined set of configuration data for returning from the event; and
returning from said event.

29. The method of claim 14, further comprising:
executing an event service routine for handling the event;
after execution of said event service routine, altering the operation mode associated with the microcontroller system.

30. The method of claim 14, wherein the event is associated with an event service routine for handling the event that expects a response signal for verifying system conditions based on a predetermined condition, further comprising:
saving system configuration information associated with a system configuration active upon receiving the event;
executing the event service routine;
when the expected response signal is received based on the predetermined condition:
restoring said system configuration information associated with a system configuration active upon receiving the event,
configuring the microcontroller system corresponding to said restored system configuration information; and
returning from said event;
when the expected response signal is not received based on the predetermined condition:
determining an operation mode for returning from the event associated with a safe operation of the microcontroller system;
returning from said event.

31. A non-transitory computer readable medium having stored thereon a computer program product comprising program instructions which are computer-executable to implement all steps of the method of claim 14.

* * * * *